United States Patent
Oweis et al.

(10) Patent No.: US 6,187,062 B1
(45) Date of Patent: Feb. 13, 2001

(54) CURRENT COLLECTION THROUGH THERMALLY SPRAYED TABS AT THE ENDS OF A SPIRALLY WOUND ELECTROCHEMICAL CELL

(75) Inventors: Salah Oweis, Ellicott City, MD (US); Raymond A. Zatorski, East Hampton, CT (US); Guy Chagnon, Columbia, MD (US); Gerard Rigobert, Poitiers; Laurent Souliac, Saint Benoit, both of (FR)

(73) Assignee: Alcatel, Paris (FR)

( * ) Notice: Under 35 U.S.C. 154(b), the term of this patent shall be extended for 0 days.

(21) Appl. No.: 09/097,659

(22) Filed: Jun. 16, 1998

(51) Int. Cl.[7] .................................................. H01M 6/00
(52) U.S. Cl. ............................ 29/623.1; 429/94; 429/211
(58) Field of Search ................................ 29/623.1, 623.5; 429/211, 94

(56) References Cited

U.S. PATENT DOCUMENTS 3,891,901  6/1975  Booe et al. .
4,480,285  10/1984  Grahame .
5,415,954  5/1995  Gauthier et al. .
5,972,532  * 10/1999  Oweis et al. .

FOREIGN PATENT DOCUMENTS

966053  * 12/1999  (EP) .

* cited by examiner

Primary Examiner—Carol Chaney
Assistant Examiner—Susy Tsang
(74) Attorney, Agent, or Firm—Sughrue, Mion, Zinn, Macpeak & Seas, PLLC

(57) ABSTRACT

A method of making an electrochemical cell, and an electrode stack made thereby. The method includes fabrication of a coating onto selected areas of the ends of the stack by a thermal spray coating process in which the coating is applied to one of the electrodes in the stack without the coating contacting the alternate edges of the other electrode in the stack. Suitable conductive strips, compatible with the substrate materials that make up the electrodes of the cell, can be attached to the thermally sprayed coating layers, or can be embedded into the sprayed materials as they are applied to the electrode stack.

25 Claims, 3 Drawing Sheets

FIG. 5
FIG. 6
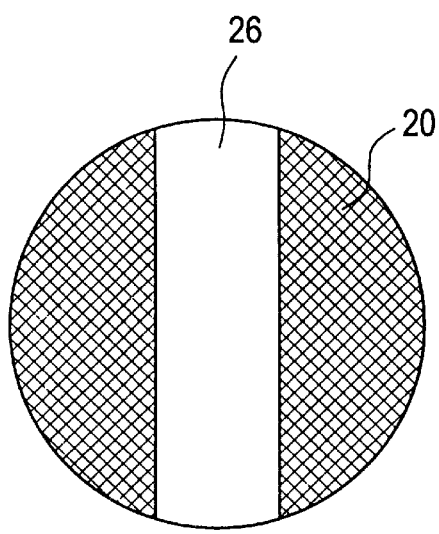
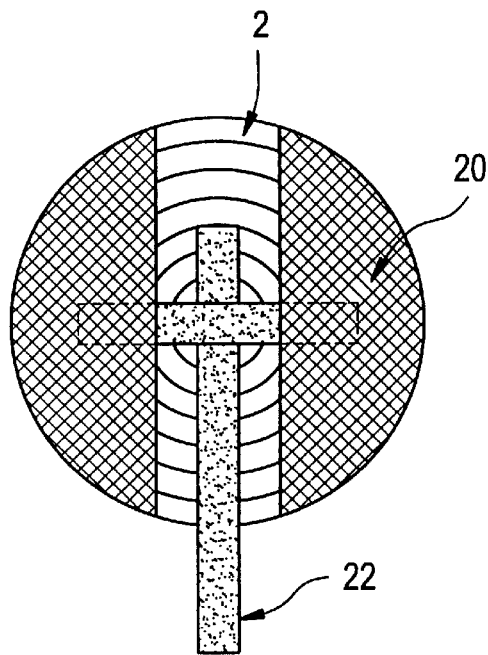

CURRENT COLLECTION THROUGH THERMALLY SPRAYED TABS AT THE ENDS OF A SPIRALLY WOUND ELECTROCHEMICAL CELL

BACKGROUND OF THE INVENTION

In general, this invention is directed to a technique for improving the current collection capability in an electrochemical cell by depositing a connection coating onto the exposed ends of the electrodes in a spirally wound electrochemical cell.

In a typical spirally wound electrochemical cell, a first conductive layer and a second conductive layer are separated by insulating layers which alternate with the conductive layers. The conductive layers are offset from one another, so that the first conductive layer extends beyond the insulating layers and the second conductive layer in one direction. The second conductive layer extends beyond the insulating layers and first conductive layer in an opposite direction. The layers are then rolled together to form a jelly-roll style electrode stack wherein the first conductive layer forms a positive electrode at one end of the stack, and the second conductive layer forms a negative electrode at a second end of the stack opposite the stack first end.

A first spiral space is defined in the first end of the jelly-roll by the portion of the first conductive sheet which is not layered with either insulation or the second conductive sheet. A second spiral space is defined in the second end of the jelly-roll by the portion of the second conductive sheet which is not layered with either insulation or the first conductive sheet. The electrodes are then connected to terminals of a fluid tight casing for use as a battery. Before the casing is sealed shut, an electrolyte is put into the casing, surrounding the electrodes. The electrolyte aids in the development of an electrical potential difference between the electrodes in the cell.

In the typical electrochemical cell, the electrodes are connected to the terminals of the battery by tabs extending from the electrode sheet itself, or by tap straps. Another method of connection is to edge weld the tabs to the spiral end of the electrodes. These methods, however, suffer the problem of only being capable of carrying a limited amount of current from the cell. The tabs do not connect to a sufficient area of the electrode to carry larger currents associated with bigger batteries. Moreover, welding additional tabs presents problems in manufacture of the batteries, such as limiting the area by which electrolyte can be introduced into the electrode, and increasing the cost as well as production time of the battery.

SUMMARY OF THE INVENTION

One object of the present invention is to improve the current collection capacity from an electrochemical cell by overcoming the problems associated with the present current collection methods.

Another object of the present invention is to improve the current collection capacity from an electrochemical cell by providing an improved method of attaching a contact to a spirally wound electrode.

Yet another object of the present invention is to improve the current collection capacity from an electrochemical cell by providing increased contact area between the contact and a spirally wound electrode.

The present invention achieves these and other objects through a process of fabricating a conductive coating on the spirally wound electrode. The contact area is increased because the coating contacts the electrode over more than merely the spirally wound edge of the electrode sheet. The conductive coating can be formed onto selected areas of a spirally wound electrode by a thermal spray process.

The coating is deposited onto the spirally wound electrode in such a manner that it only coats one of the electrodes, without any of the coating particles contacting the insulating layer or the other electrode. This objective is accomplished by spraying the coating in a direction at an angle to the longitudinal axis of the electrode jelly-roll.

The angle of spray, with respect to the electrode stack longitudinal axis, depends upon the distance by which the two electrode substrates of the cell are offset. The angle of spray can be varied between about 20° and about 80°. Best results are achieved when the angle of spray is between about 45° and about 70°. By spraying at a suitable angle, the need for applying an insulating material to the jelly-roll ends, to protect against unwanted contact between the spray coating and the alternate electrode, is eliminated.

The conductive coating is made of metal particles or the like. Any metallic or cermet materials can be used for the spray coating including, but not limited to, aluminum, copper, zinc, zinc-aluminum alloy, and tin alloys. Conductive or loaded polymers can also be used. Zinc is an economical metal to use for the coating, and can be applied with either combustion wire or two wire arc thermal spray processes. The material of the conductive coating should be matched to that of the electrode onto which it is formed.

Any number of techniques can be used to deposit the conductive coating onto the spirally wound electrodes, including but not limited to, using a combustion wire thermal spray gun, using a two wire arc gun, or using an Arc Plasma thermal spray system. However, the spray coating must be applied in such a manner that the temperature of the cell ends remains below the thermal melting point of the insulating layer between the electrodes. If the temperature of the cell is raised above the insulating layer melting point, a short between electrode layers may result which can decrease the capacity of the battery or even make it inoperative.

Further, a mask or shield is used to cover areas of the electrode end so that the coating is applied to only a selected portion of the electrode. The mask can be flexible as for example when made of any suitable tape. Alternatively, the mask can be a rigid shell shaped to fit over one end of the electrode stack. The mask can be designed to allow any shaped coating to be applied to the electrode stack by covering any desired areas of the electrode to thus leave uncoated portions. Uncoated portions of the electrode are necessary for insertion of liquid, electrolyte, or chemical slurry, into the spiral space of the electrode for proper operation of the battery. The mask can be inserted into the spray path at any point between the spray outlet and the electrode surface.

Additionally, suitable electrically conductive wires, tabs strips, or the like, can be welded onto the thermally sprayed layers by laser welding, for example. Alternatively, the electrically conductive wires, tabs, strips, or the like, can be embedded into the coating during the thermal spray process for electrical connection to the spirally wound electrode substrate edges.

To improve the bond strength between the spray coating and the areas to be coated on the electrode ends, conductive wires, tabs, strips, or the like, the areas to be coated can be provided with a texture, either before or after arranging in a stack, e.g., by brushing with a wire brush, grit blasting, perforation, providing with a dimple or waffle pattern, etc. The material from which the electrically conductive wires, tabs, strips, or the like, are made is compatible with that of the electrode substrate to which they are attached and with the spray material with which they are attached so as to avoid formation of a galvanic cell.

The invention may be used in, but is not limited to, the production of lithium-ion cells. One example of a lithium-ion cell uses an aluminum foil substrate for the positive electrode, and a copper foil substrate for the negative electrode. The invention may be used in manufacturing other types of cells including, but not limited to, nickel metal hydride cells and nickel cadmium cells. The invention can be practiced on any size of cell, but is particularly useful in manufacturing cells for electric vehicles.

The foregoing objects of the present invention, together with the features and advantages thereof, will be made apparent from the following description, in which like reference characters designate the same or similar parts throughout the drawings.

BRIEF DESCRIPTION OF THE DRAWINGS

FIG. 5 is a top view of a rigid hard shell mask of the present invention.

FIG. 6 is a top view of a jelly-roll electrode having a wire connection tab and a rigid hard shell mask of the present invention thereon.

DETAILED DESCRIPTION OF THE INVENTION

Figure 1:
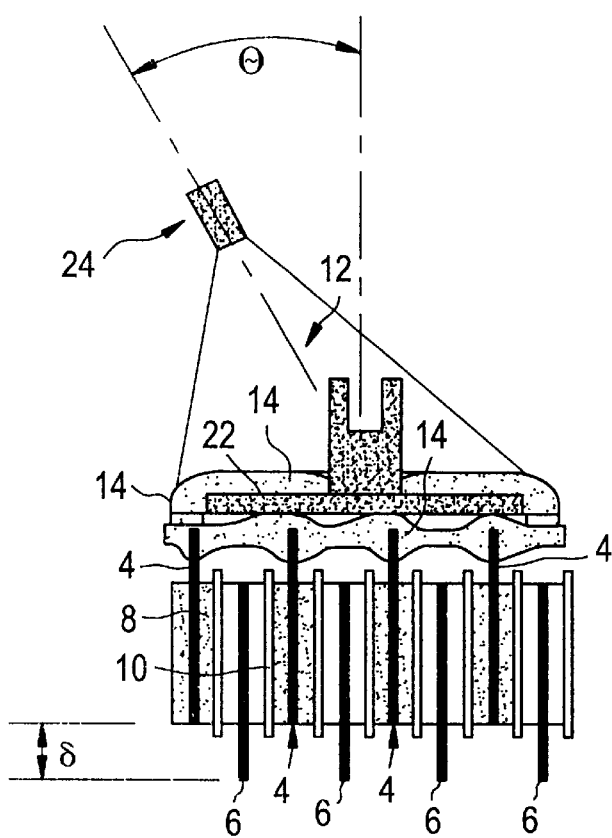
FIG. 1 is a cut away view of a jelly-roll electrode having a wire tab connected thereto by the thermal spray process of the present invention.

A jelly-roll electrode stack 1 includes a first electrode 4 and a second electrode 6, separated by insulation layers 8,10. The electrodes are offset from one another by a distance 8 (shown in FIG. 1) so that one end of the first electrode 4 extends from a first end 2 of the electrode stack 1 and is not covered by either insulation 8,10 or the second electrode 6. The second electrode 6 extends from a second end of the electrode stack 1 and is not covered by either insulation 8,10 or the first electrode 4. By forming the electrode stack in such a manner, a spiral space is formed at both the first and second ends of the electrode stack.

The present invention includes a process for connecting current collectors to the ends of spirally wound electrodes in a jelly-roll type electrode stack, and a spirally wound electrode stack formed thereby. The process for fabricating a coating 14 onto the electrodes is similar for both electrodes 4,6 and thus the process will only be described for the first electrode 4, with the understanding that it is similar for the second electrode 6 in the jelly-roll stack 1.

A thermal spray 12 is ejected from a spray nozzle 24. The nozzle 24 can be the outlet of, for example, a combustion wire thermal spray gun, a two wire arc gun, or an Arc Plasma thermal spray system. The axis of the nozzle 24 is set at an angle $\Theta$ to the longitudinal axis of the electrode stack 1. The angle $\Theta$ is set so that no coating particles contact the insulating layers, 8 and 10, or the second electrode 6. If the coating particles contact the insulation layers or the second electrode, a short between electrode layers may result which can decrease the capacity of the battery or even make it inoperative. The angle $\Theta$ can vary between about 20° and about 80°, depending on the amount of offset $\delta$ between the first and second electrodes. Angle $\Theta$ is preferably between about 45° and about 70°.

The thermal spray is made of metal particles or the like. Any metallic or cermet materials can be used, but the material of the spray is preferably matched to the material of the electrode onto which it is deposited. Thus, for example, if the electrode 4 is the copper electrode of a lithium-ion cell, the spray coating 14 would also be copper. The temperature of the thermal spray must be set so as to keep the end of the electrode stack below the melting temperature of the insulation layers. In a lithium-ion cell, for example, the temperature of the electrode stack should be kept below 110° F. One way to do so is to keep the temperature of the thermal spray 12 below 110° F.

As shown in FIG. 1, the coating 14 contacts not only the end of electrode 4, as in a typical connection, but also contacts portions of the sides of the electrode thereby increasing the area of current collection. The coating 14 can be of any desired thickness but is preferably 0.1" (2.5 mm). Battery terminals can be directly connected to the coating 14, or a conductive wire, strip, tab, or the like, 22 can be connected between the coating 14 and the battery terminal. When a conductive wire, strip, tab, or the like 22 is used, it can be connected to the top of the coating 14, by laser welding for example, or can be embedded in the coating 14. The conductive wire, strip, tab, or the like 22 is electrically connected to both the coating 14 and the electrode 4,6 end.

The electrode can be masked off prior to being spray coated with thermal spray 12 to form a current collection area. Masking the electrode serves two functions. First, the portion of the electrode stack end 2 that is covered by the mask will not be coated with thermal spray 12, and thus leaves an open space for the introduction of an electrolyte into the electrode stack. Second, the portion of the electrode stack end 2 that is uncovered by the mask will be coated by thermal spray 12 which forms a coating 14 for current collection from the electrode. The size and shape of the current collection area formed by coating 14 is determined by the size and shape of the mask applied to the electrode stack end 2.

To improve the bond strength between the spray coating and the areas to be coated on the electrode ends, conductive wires, tabs, strips, or the like, the areas to be coated on the electrode ends, and optionally the wires, tabs, strips or the like as well, can be provided with a texture, either before or after arranging in a stack, e.g., by brushing with a wire brush, grit blasting, perforation, providing with a dimple or waffle pattern, etc.

Figure 2:
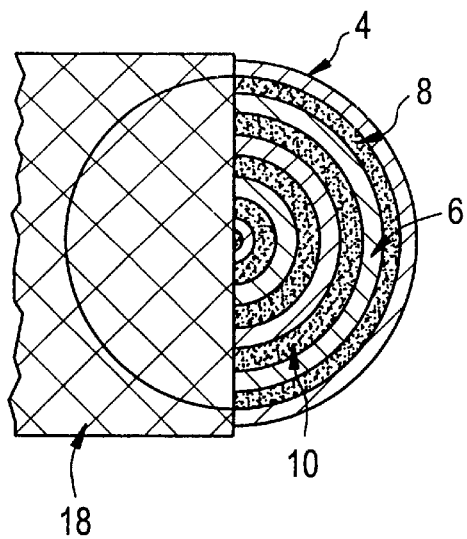
FIG. 2 is a top view of a jelly-roll electrode having a mask of the present invention thereon.

FIG. 2 shows a top view of a spirally wound jelly-roll type electrode stack I which includes a first electrode 4, and a second electrode 6, separated by insulation layers 8,10. A portion of the electrode stack end 2 is masked off by a flexible type of mask 18. Flexible mask 18 has the advantage of being easy to use, and is inexpensive. The flexible mask 18 readily conforms to the end surface of the electrode 4,6 and can be easily shaped. The flexible mask 18 can be made of any suitable tape, for example.

Figure 3:
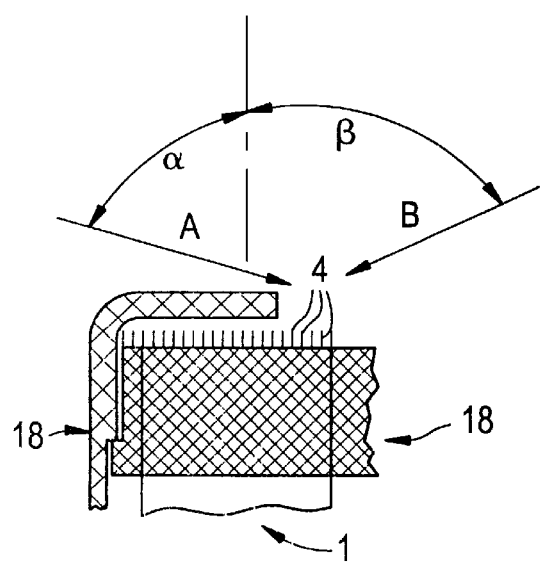
FIG. 3 is a side view of a jelly-roll electrode having a mask of the present invention thereon.

FIG. 3 shows a side view of a jelly-roll electrode stack 1 having a flexible mask 18 thereon. When tape is used, for example, a first strip of tape can be applied to the end 2 of the electrode stack, and then bent down along the side of the stack. Then, a second strip of tape can be wound around the circumference of the electrode stack to hold the first strip of tape in place, and also to prevent any overspray from contacting the outside of the electrode stack 1. As can be seen in FIG. 3, when the electrode is properly masked off, the top of first electrode 4 is exposed together with the spiral space between the rolled layers of first electrode 4 which are not layered with insulation 8,10 or second electrode 6. Thermal spray 12 can then be deposited over the top of first electrode 4, and into a portion of the spiral space formed by electrode 4.

Figure 4:
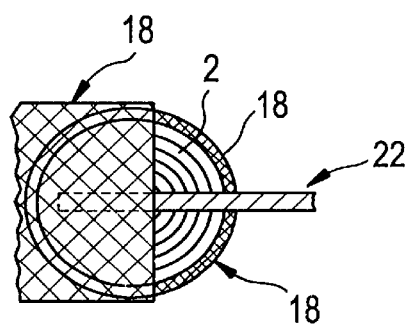
FIG. 4 is a top view of a jelly-roll electrode, together with a wire connection tab, having a mask of the present invention thereon.

FIG. 4 shows the use of a flexible mask 18 in conjunction with a conductive wires strip, tab, or the like, 22. In this case, the mask 18 is used not only to form the desired coating shape, but also to hold the conductive wire, strip, tab, or the like, 22 in place on the end 2 of the jelly-roll electrode stack 1. When flexible mask 18 is used, the conductive wire, strip, tab, or the like 22 is shaped as a linear bar, for example. However, any shape desired can be used as long as a portion of the conductive wire, strip, tab, or the like, is inserted under the flexible mask so that it is held in place.

Alternatively, the mask can take the form of a rigid shell 20, as shown in FIG. 5. The rigid shell is formed as a cylinder closed at one end and has a diameter slightly larger than that of the cylindrical electrode stack 1 so that it snugly fits over the top of the electrode stack. The rigid shell 20 also includes a portion 26 cut out of the closed end. The cut out portion 26 defines the shape of the coating 14 formed on the electrode. The cut out portion 26 is shown as linear across the diameter of the electrode stack, but can be any shape desired. The rigid shell 20 can be made of any suitable plastic that has a melting temperature higher than the temperature of the thermal spray. Further, the rigid shell 20 can be made by any suitable process such as injection molding or extruding.

FIG. 6 shows a rigid shell mask 20 on the end 2 of a jelly-roll electrode stack. In this case, the mask 20 is used not only to form the desired shape of coating 14, but also to hold conductive wire, strip, tab, or the like 22 in place on the electrode stack. Again, the conductive wire, strip, tab, or the like 22 can have any shape desired as long as a part thereof fits under rigid shell 20 to hold the strip 22 in place. The shape of the conductive wire, strip, tab, or the like 22 can vary depending upon the shape of the cut out portion 26 of the rigid mask 20. One example, as shown in FIG. 6, is for the cut out portion 26 to be linear across the diameter of the electrode stack and for the conductive wire, strip, tab, or the like 22 to be in the shape of a cross having a long portion extend along the diameter of the electrode stack and a short portion extend under the rigid shell 20.

Figure 10:
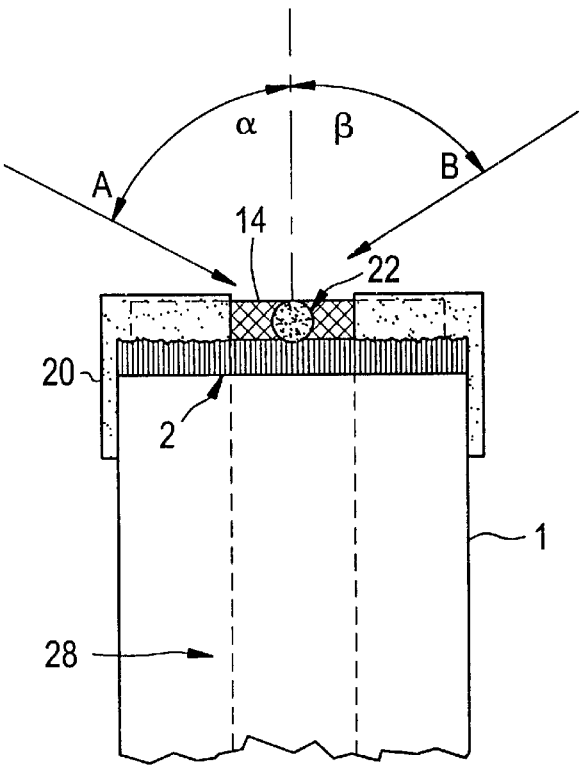
FIG. 10, is a partial cut away view of the jelly-roll electrode shown in FIG. 9.

Once the electrode is properly masked off, a coating 14 is then deposited thereon, for example by spray coating with thermal spray 12 as described above, to form an area for current collection. The coating is deposited on the top of the electrode, as well as in a portion of the spiral space formed by the electrode. When the coating is deposited by thermal spray, it is usually sufficient to spray from only one direction. However, the coating can be deposited by thermal spray from more than one direction, for example, along arrows A and B as shown in FIGS. 3 and 10. FIG. 3 shows the use of more than one spray direction in conjunction with a flexible mask, whereas FIG. 10 shows more than one spray direction used in conjunction with a rigid mask 20 and a conductive wire, strip, tab, or the like 22. The angle α and B that each respective spray direction A and B, makes with the longitudinal axis of the electrode stack can be between about 20° and about 80° and is preferably between about 45° and about 70°. Angle α can either be the same as, or different from, the angle β.

Figure 7:
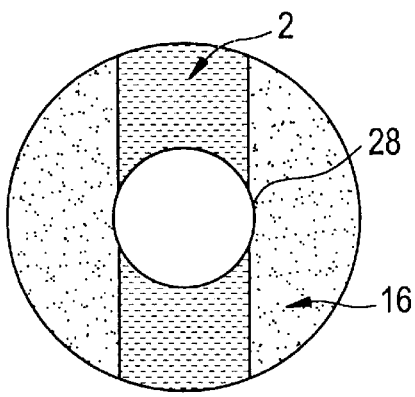
FIG. 7 is a top view of a jelly-roll electrode having a mandrel therein and a mask of the present invention thereon.
Figure 9:
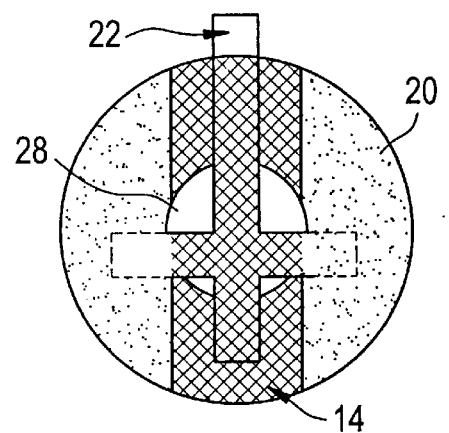
FIG. 9 is a top view of a jelly-roll electrode having a mandrel therein, as well as a wire strip and a mask of the present invention thereon.
Figure 8:
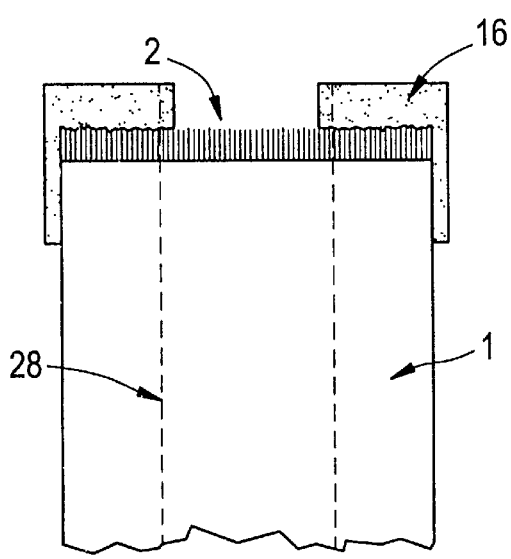
FIG. 8 is a partially cut away side view of the jelly-roll electrode shown in FIG. 7.

As shown in FIGS. 7–10, the jelly-roll electrode stack 1 can be wound around a mandrel 28 which is a cylinder open at both ends. A mask 16 can be used in conjunction with a jelly-roll electrode stack 1 that includes a mandrel 28, as shown in FIGS. 7–8. Mask 16 includes arcuate portions near the center thereof to accommodate the mandrel 28. Further, a conductive wire, strip, tab, or the like 22 and mask 20 can be used together in conjunction with a jelly-roll electrode stack 1 that has a mandrel 28, as shown in FIGS. 9–10. Various combinations of mask, conductive wire, strip, tab, or the like, electrode stack, and spray parameters, can be used.

The foregoing description is merely exemplary and is not to be construed in a limiting sense. Modifications will be readily apparent to those of ordinary skill in the art, and are considered to be within the scope of the invention, which is to be limited only by the following claims.

We claim:

1. A method of making an electrochemical cell comprising the steps of:

providing a first conductive sheet having a first end;

providing a layer of insulation on said first conductive sheet such that said layer of insulation covers less than the entire area of said first conductive sheet;

providing a second conductive sheet having a first end;

laying said second conductive sheet on said layer of insulation such that said first end of said second conductive sheet is substantially parallel to said first end of said first conductive sheet but is offset in a direction transverse to said first ends;

rolling said first conductive sheet, said layer of insulation, and said second conductive sheet together to form a jelly-roll stack having a longitudinal axis transverse to said first ends of said first and second conductive sheets such that the first end of said first conductive sheet forms a spiral space at a first end of the stack;

spraying a first conductive material along a first spray path onto said first end of said stack such that said conductive material does not contact said second conductive sheet, said first spray path forming an angle of between 20° and 80° with respect to said longitudinal axis.

2. The method of making an electrochemical cell as claimed in claim 1, further comprising the step of providing a mask in said first spray path so that said first conductive material only enters selected portions of said first spiral space.

3. The method of making an electrochemical cell as claimed in claim 2, wherein said selected portion comprises a strip across a diameter of said end of said stack.

4. The method of making an electrochemical cell as claimed in claim 1, wherein said spraying step is conducted so that the temperature of the stack remains less than the melting point temperature of said insulation.

5. The method of making an electrochemical cell as claimed in claim 4, wherein said spraying step is conducted so that the temperature of the stack remains less than about 110° F.

6. The method of making an electrochemical cell as claimed in claim 1, wherein said angle is in the range of from about 45° to about 70°.

7. The method of making an electrochemical cell as claimed in claim 1, wherein said first conductive material has the same composition as said first conductive sheet.

8. The method of making an electrochemical cell as claimed in claim 1, wherein said spraying step is conducted so that the temperature of said first conductive material remains less than the melting point temperature of said insulation.

9. The method of making an electrochemical cell as claimed in claim 8, wherein said spraying step is conducted so that the temperature of said first conductive material remains less than about 110° F.

10. A method of making an electrochemical cell comprising the steps of:

providing a first conductive sheet having a first end;

providing a layer of insulation on said first conductive sheet such that said layer of insulation covers less than the entire area of said first conductive sheet:

providing a second conductive sheet having a first end;

laying said second conductive sheet on said layer of insulation such that said first end of said second conductive sheet is substantially parallel to said first end of said first conductive sheet but is offset in a direction transverse to said first ends;

rolling said first conductive sheet, said layer of insulation, and said second conductive sheet together to form a jelly-roll stack having a longitudinal axis transverse to said first ends of said first and second conductive sheets such that the first end of said first conductive sheet forms a spiral space at a first end of the stack; and spraying a first conductive material along a first spray path onto said first end of said stack such that said conductive material does not contact said second conductive sheet, said first spray path forming an angle of between 20° and 80° with respect to said longitudinal axis, further comprising the step of placing a conductive strip on the first end of said first conductive sheet before said spraying step.

11. The method of making an electrochemical cell as claimed in claim 10, wherein said strip includes holding portions extending therefrom, said method further comprising the step of providing a mask over selected portions of said end of said stack such that the mask covers said holding portions of said conductive strip, thereby retaining said strip on said first end of said stack during said spraying step.

12. The method of making an electrochemical cell as claimed in claim 10, further comprising the step of providing a textured surface portion on said first conductive sheet, at least a portion of said textured surface being covered by said conductive material during said spraying step.

13. The method of making an electrochemical cell as claimed in claim 12, wherein said textured surface portion comprises perforations through said first conductive sheet.

14. The method of making an electrochemical cell as claimed in claim 12, wherein said textured surface portion comprises impressions in said first conductive sheet.

15. The method of making an electrochemical cell as claimed in claim 12, wherein said step of providing a textured surface comprises brushing or grit blasting said first conductive sheet to form said textured surface portion.

16. A method of making an electrochemical cell having first and second electrodes extending substantially parallel to one another and separated by an insulating material, said electrodes being arranged in a rolled stack having a longitudinal axis, said first electrode extending farther along said longitudinal axis than said second electrode at a first end of said stack to form a first end face having a spiral space therein, said method comprising the step of:

disposing a mask over said first end of said stack to expose only a portion of said first end face; and spraying conductive material along a first spray path onto said first end of said stack such that said conductive material enters said spiral space only at said exposed portion of said first end face, said first spray path forming an angle of between 20° and 80° with respect to said longitudinal axis.

17. The method of making an electrochemical cell as claimed in claim 16, wherein said portion comprises a strip across a diameter of said first end of said stack.

18. The method of making an electrochemical cell as claimed in claim 16, further comprising the step of placing a conductive strip on the first end of said stack before said spraying step.

19. The method of making an electrochemical cell as claimed in claim 18, wherein said strip includes holding portions extending therefrom, and said mask covers said holding portions of said conductive strip thereby retaining said strip on said first end of said stack during said spraying step.

20. The method of making an electrochemical cell as claimed in claim 16, further comprising the step of providing a textured surface portion on said first electrode, at least a portion of said textured surface being covered by said conductive material during said spraying step.

21. The method of making an electrochemical cell as claimed in claim 20, wherein said textured surface portion comprises perforations through said first conductor.

22. The method of making an electrochemical cell as claimed in claim 20, wherein said textured surface portion comprises impressions in said first electrode.

23. The method of making an electrochemical cell as claimed in claim 20, wherein said step of providing a textured surface comprises brushing or grit blasting said first electrode to form said textured surface.

24. A method of making an electrochemical cell comprising the steps of:

providing a first conductive sheet having a first end;

providing a layer of insulation on said first conductive sheet such that said layer of insulation covers less than the entire area of said first conductive sheet;

providing a second conductive sheet having a first end;

laying said second conductive sheet on said layer of insulation such that said first end of said second conductive sheet is substantially parallel to said first end of said first conductive sheet but is offset in a direction transverse to said first ends;

rolling said first conductive sheet, said layer of insulation, and said second conductive sheet together to form a jelly-roll stack having a longitudinal axis transverse to said first ends of said first and second conductive sheets such that the first end of said first conductive sheet forms a spiral space at a first end of the stack; and spraying a first conductive material along a first spray path onto said first end of said stack such that said conductive material does not contact said second conductive sheet, said first spray path forming an angle of between 20° and 80° with respect to said longitudinal axis, further comprising the step of spraying a second material onto said first end along a second spray path which is at an angle with respect to said first spray path.

25. The method of making an electrochemical cell as claimed in claim 24, wherein said second material has the same composition as said first conductive material.

* * * * *